US008230485B2

(12) United States Patent  (10) Patent No.: US 8,230,485 B2
Reasor et al.  (45) Date of Patent: Jul. 24, 2012

(54) METHOD AND SYSTEM FOR CONTROLLING ACCESS PRIVILEGES FOR TRUSTED NETWORK NODES

(75) Inventors: Sterling M. Reasor, Bellevue, WA (US); Ramesh Chinta, Sammamish, WA (US); Paul J. Leach, Seattle, WA (US); John E. Brezak, Woodinville, WA (US); Eric R. Flo, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 938 days.

(21) Appl. No.: 10/941,559

(22) Filed: Sep. 15, 2004

(65) Prior Publication Data

US 2006/0059359 A1  Mar. 16, 2006

(51) Int. Cl.
*G06F 7/04* (2006.01)
(52) U.S. Cl. ............ 726/5; 726/1; 726/2; 709/225; 711/147; 711/148; 711/149; 711/150; 711/151; 711/152; 711/153; 713/155; 713/156; 713/157; 713/158; 713/159; 713/186; 382/115; 380/247; 380/248; 380/249; 380/250
(58) Field of Classification Search .......... 726/1–21; 709/225; 711/147–153; 713/155–159, 186; 382/115; 380/247–250
See application file for complete search history.

(56) References Cited

U.S. PATENT DOCUMENTS

| | | | | |
|---|---|---|---|---|
| 6,000,033 | A * | 12/1999 | Kelley et al. ............. | 726/8 |
| 6,161,139 | A * | 12/2000 | Win et al. ............... | 709/225 |
| 6,647,497 | B1 * | 11/2003 | Cromer et al. ........... | 726/16 |
| 6,807,577 | B1 * | 10/2004 | Gillespie et al. ......... | 709/227 |
| 6,851,060 | B1 * | 2/2005 | Shrader ................ | 726/10 |
| 6,889,328 | B1 | 5/2005 | Sanchez Herrero et al. | 713/200 |
| 6,993,658 | B1 * | 1/2006 | Engberg et al. .......... | 713/185 |
| 7,043,489 | B1 * | 5/2006 | Kelley ................ | 1/1 |
| 7,150,038 | B1 * | 12/2006 | Samar ................ | 726/8 |
| 7,197,765 | B2 * | 3/2007 | Chan et al. ............ | 726/8 |

(Continued)

FOREIGN PATENT DOCUMENTS

CN  1365562 A  8/2002

(Continued)

OTHER PUBLICATIONS

Haskett, James A., *Pass-Algorithms: A User Validation Scheme Based on Knowledge of Secret Algorithms*, Communications of the ACM, v. 27, No. 8, pp. 777-781 (Aug. 1984).

(Continued)

*Primary Examiner* — Edan Orgad
*Assistant Examiner* — Roderick Tolentino
(74) *Attorney, Agent, or Firm* — Merchant & Gould (57) ABSTRACT

A system and method for controlling access to a computer provides for loose security within a local network while retaining strong security against external access to the network. In one embodiment, a user has access to trusted nodes in a secured group within an unmanaged network, without being required to choose, enter and remember a login password. To establish such a secure blank password or one-click logon account for the user on a computer, a strong random password is generated and stored, and the account is designated as a blank password account. If the device is part of a secured network group, the strong random password is replicated to the other trusted nodes. When a user with a blank password account wishes to log in to a computer, the stored strong random password is retrieved and the user is authenticated.

20 Claims, 4 Drawing Sheets

U.S. PATENT DOCUMENTS

| | | | |
|---|---|---|---|
| 7,302,581 B2 * | 11/2007 | Utsumi et al. | 713/183 |
| 7,308,580 B2 * | 12/2007 | Nelson et al. | 713/183 |
| 7,640,324 B2 | 12/2009 | Sinclair et al. | 709/220 |
| 2001/0044894 A1 * | 11/2001 | Saito et al. | 713/156 |
| 2002/0078386 A1 * | 6/2002 | Bones et al. | 713/202 |
| 2003/0200466 A1 | 10/2003 | Nelson et al. | 726/3 |
| 2004/0034583 A1 * | 2/2004 | Lanier et al. | 705/35 |
| 2004/0054592 A1 * | 3/2004 | Hernblad | 705/15 |
| 2004/0059924 A1 * | 3/2004 | Soto et al. | 713/186 |
| 2004/0193921 A1 * | 9/2004 | Byrne | 713/201 |
| 2004/0199795 A1 * | 10/2004 | Grewal et al. | 713/202 |
| 2004/0210767 A1 | 10/2004 | Lyndersay et al. | |
| 2005/0091337 A1 | 4/2005 | Reasor et al. | |
| 2005/0170321 A1 * | 8/2005 | Scully | 434/219 |
| 2005/0182654 A1 * | 8/2005 | Abolfathi et al. | 705/2 |
| 2005/0268336 A1 * | 12/2005 | Finnegan | 726/15 |
| 2006/0059346 A1 * | 3/2006 | Sherman et al. | 713/175 |

FOREIGN PATENT DOCUMENTS

| | | |
|---|---|---|
| JP | 63-286950 | 11/1988 |
| JP | 05-030103 | 2/1993 |
| JP | 2000-172500 | 6/2000 |
| JP | 2001-188755 | 10/2001 |
| JP | 2003-162509 | 6/2003 |
| JP | 2005-501353 | 1/2005 |
| JP | 2006-504189 | 2/2006 |
| WO | 2003/019896 | 3/2003 |
| WO | 2004/038563 | 5/2004 |

OTHER PUBLICATIONS

Israel, Jay E. et al., *Authentication in Office System Internetworks*, ACM Transactions on Information Systems, v. 1, No. 3, pp. 193-210 (Jul. 1983).

Rolin, P. et al., *Network Security Probe*, Proceedings of the 2nd ACM Conference on Computer and Communications Security, pp. 229-240 (Nov. 1994).

Samar, Vipin, *Unified Login with Pluggable Authentication Modules (PAM)*, Proceedings of the 3rd ACM Conference on Computer and Communications Security, pp. 1-10 (Jan. 1996).

Zurko, Mary Ellen, et al., *User-Centered Security*, Proceedings of the 1996 ACM Workshop on New Security Paradigms, pp. 27-33 (Sep. 1996).

* cited by examiner

METHOD AND SYSTEM FOR CONTROLLING ACCESS PRIVILEGES FOR TRUSTED NETWORK NODES

FIELD OF THE INVENTION

The present invention relates generally to computers and computer networks, and more particularly to a method and system for providing secure user account access to trusted nodes in unmanaged computer networks without requiring the user to choose, enter and remember a login password.

BACKGROUND OF THE INVENTION

Large-scale computer networks feature sophisticated administration schemes for managing user access. A large network typically includes multiple domains, each of which has a primary domain controller with a database of usernames, passwords and permission information for machines in the domain. An authorized user can log on to any machine in the domain using the same username and password. A password change made by the user while logged on to one machine is recognized by the other machines in the domain.

By contrast, small-scale local networks, such as home networks, are generally unmanaged, having no dedicated, "always-on" device for handling account information in a centralized and automatic manner. The machines in an unmanaged network are typically connected to the same hub or router and usually operate as a loosely-organized, peer-to-peer workgroup. Such networks have characteristically been inconvenient for users. For example, until recently, a user was required to establish a local account on each device in the network that the user wished to access. When a user changed a password on one machine, the change was not automatically replicated to the remaining machines in the group.

Improvements relating to small-scale unmanaged networks have been described in two commonly-assigned, co-pending patent applications. In "Small-Scale Secured Computer Network Group Without Centralized Management," application Ser. No. 10/414,354, filed on Apr. 15, 2003, there is provided a platform and method for organizing a secure network group of mutually-trusting devices. Common user access and resource sharing among the computers in the group are achieved by replicating a database of user accounts, user profiles, and user security identification to each of the machines. An authorized user can log on to any of the computers in the group with the same username and password. When a user changes his password on one of the computers, the change is replicated to the rest of the group. In "System and Method for Generating Aggregated Data Views in a Computer Network," application Ser. No. 10/691,872, filed on Oct. 23, 2003, there is provided a system and method for managing content among the machines in a network. A user causes a machine to issue a local content query associated with the user's security identification profile, and the query is distributed across several devices in the network. Query responses are merged and an aggregated view is generated. U.S. patent application Ser. Nos. 10/414,354 and 10/691,872 are each incorporated herein by reference.

Computer users desire both convenience and security against unauthorized access to their data. Users of home networks typically require protection from unauthorized outside intrusion, but do not expect significant security within the network, because ordinarily only authorized users have physical access to a machine in the network. Users of standalone computers or small-scale networks have separate user accounts not primarily for reasons of security, but for data separation and individual user convenience. Thus on single machines users generally prefer the convenience of accounts not protected by a password (more precisely, accounts in which the passwords are blank). Home networks such as those based on Microsoft® Windows® operating systems, however, have a trust model that requires a user to have a password-protected account on a machine in order for the user to gain access to the machine from another machine within the network.

Users are advised to employ relatively complex or "strong" account passwords in order to guard against unauthorized access by way of dictionary attacks and brute force guessing of passwords. Strong passwords are at least seven characters in length and include numbers and symbols. However, strong passwords are relatively difficult to remember and to type into a computer. Users generally prefer simple, easy-to-remember passwords, though such passwords are vulnerable to intruders. In a home network, if a user wishes to remotely access data, the user must have a password, but if the user does not employ a strong password, the user's data is not desirably secure. Some computer systems have an "autologon" feature, in which the user's password is stored and retrieved when the user logs in, but an autologon account is only as secure as the password that the user has chosen for that account.

SUMMARY OF THE INVENTION

The present invention is directed towards providing a method and system for controlling access to one or more computers, such as trusted nodes forming a secured group within an unmanaged network, in such a way that the advantages of loose security within a local network are achieved without comprising strong security against external access to the network. In one embodiment, a user having physical access to the machines in a network can access data from any trusted node without being required to specify, enter, and remember a password.

According to one aspect of the invention, a system for controlling access to a node in a secured network group is provided. The system includes a plurality of mutually trusted nodes forming the secured network group, and a mechanism for providing loose security within the secured network group while retaining strong security against external access to the secured network group. One such mechanism allows a user within the secured network group to access other nodes without being required to enter authentication credentials According to another aspect of the invention, a method for providing a user with access to one or more computers is disclosed. At a first computer, a strong random password is generated for a new user account. The account is designated as a blank password account, as for example by setting a flag, and the strong random password is stored in a database or the like. In an embodiment, the user can choose to establish a blank password account or a conventional account. If the computer is part of a secured network group of trusted nodes, the strong random password is replicated to the other nodes in the group.

According to another aspect of the invention, a method for controlling a user's access to a computer is provided. The user selects an account with which to log on to the machine. If the selected account is determined to be a blank password account, for example by checking for a flag, a stored strong random password associated with the account is retrieved, for example by querying a database. The user may then be authenticated based on the password. If the account is not a blank password account, the user is prompted to enter a password as in a conventional login.

The invention may be used to provide blank password or one-click logon features for user accounts that are established as biometrically authenticated accounts. Embodiments of the invention may be implemented in unmanaged and managed networks, and in standalone machines. It is complemented that the invention may be implemented in whole or in part in hardware or software or a combination thereof.

DETAILED DESCRIPTION OF THE INVENTION

Generally described, the present invention provides a system and method for controlling access to a computer, such as a trusted node in a secured local network group, in such a way that the advantages of loose security within a local network are achieved without comprising strong security against external access to the network. In one embodiment, a user having physical access to the machines in a network can access data from any trusted node without being required to specify, enter, and remember a password. The open and convenient model of the blank password accounts of standalone machines is thereby extended to a secured network. A cryptographically strong random password is generated when a user account is established as a blank password account, and this generated password is securely stored in a security account database. In embodiments of the invention the user logs in to a machine in the network merely by clicking a user tile or the like. Thus a blank password account in accordance with the invention may be described as a "one-click logon" account. Because user security account information is replicated to the several machines of the network, the user has one-click logon access to all these machines.

Figure 1:
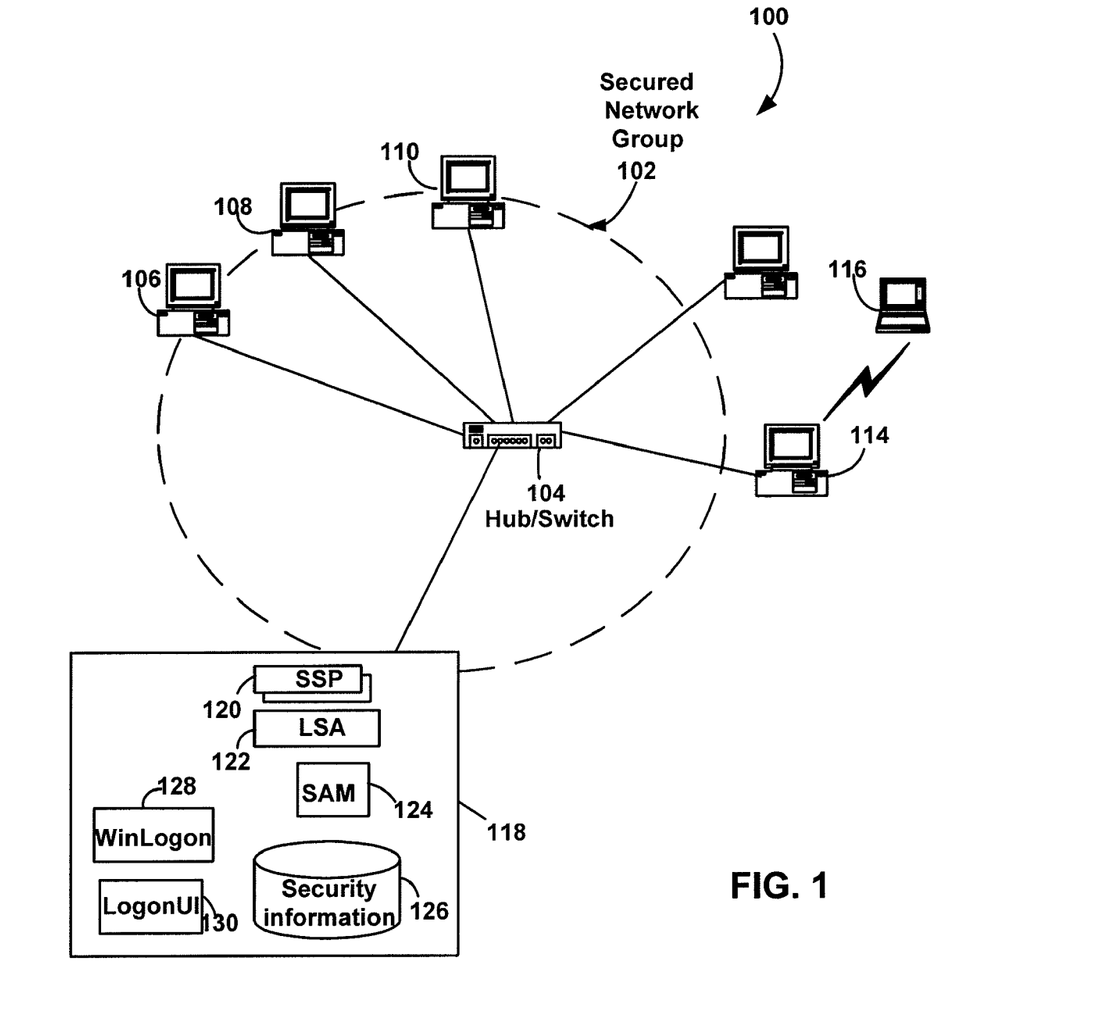
FIG. 1 is a schematic diagram showing a local computer network in which a small number of computing devices are formed into a secured network group, within which an embodiment of the invention may be situated.

Referring now to FIG. 1, the present invention is, in one embodiment, susceptible to an implementation within an unmanaged local network 100 comprising a small number of computing devices. Such a network is typical of many home networks and small business networks. The local network 100 is unmanaged in the sense that it does not have a centralized management component, such as a domain controller or the like. The illustrated local network 100 has a network hub or switch 104 and a plurality of computing devices connected thereto. The connections between the computers may be wired or wireless. For example, the device 116 communicates with the network wirelessly through an access point 114. Examples of computing devices that may be deployed in a network such as the local network 100 include, but are not limited to, personal computers, hand-held computing devices, personal digital assistants, laptop computers, mobile telephones, digital cameras, electronic devices having a processor and memory, special-purpose computing devices, and the like. The salient details of such devices are rudimentary to those having skill in the art and need not be described at length here.

As illustrated in FIG. 1, a subset of the machines in the network 100, devices 106, 108, 110 and 118, have formed a secured network group 102 (indicated schematically by the dashed lines connecting the devices), providing group-wide control over user access and resource sharing, without requiring a centralized management component. In the context of the present invention, "secured network group" means that security policies and access controls are implemented group-wide to prevent unauthorized access and use of resources by computers or users outside of the group, while allowing the sharing of resources within the group on a per-user basis. The devices in the secured network group have established trust among themselves and share information such as user account data and user profile data within the group. The secured network group does not depend on a particular network topology. A new device can join the secured network group 102, and devices in the group can leave the secured group and, in special cases, be evicted from the group.

Each computing device in the group 102 maintains a database of security information, or the equivalent, including user account data. User account data includes a unique security identifier ("SID") associated with each authorized user and used by internal processes to identify a user account. In a representative embodiment the SID is a variable-length numeric value. After a secured network group has been formed, the security information on each machine in the group is replicated to other machines in the group. The replication of security information enables a user with a valid account to log on to any computer in the group. A more detailed explanation of the replication of security profile information across a computing network is provided in the commonly assigned, co-pending application Ser. No. 10/414, 354, "Small-Scale Secured Computer Network Group Without Centralized Management," filed on Apr. 15, 2003, which has been incorporated herein by reference.

A device in the secured group 102, such as the computer 118, includes a local security authority (LSA) 122, security support provider (SSP) 120, security account manager (SAM) 124, stored security information 126, authentication engine ("WinLogon") 128, and the user login display ("LogonUI") 130. These components are described further below in reference to FIG. 4.

Figure 2:
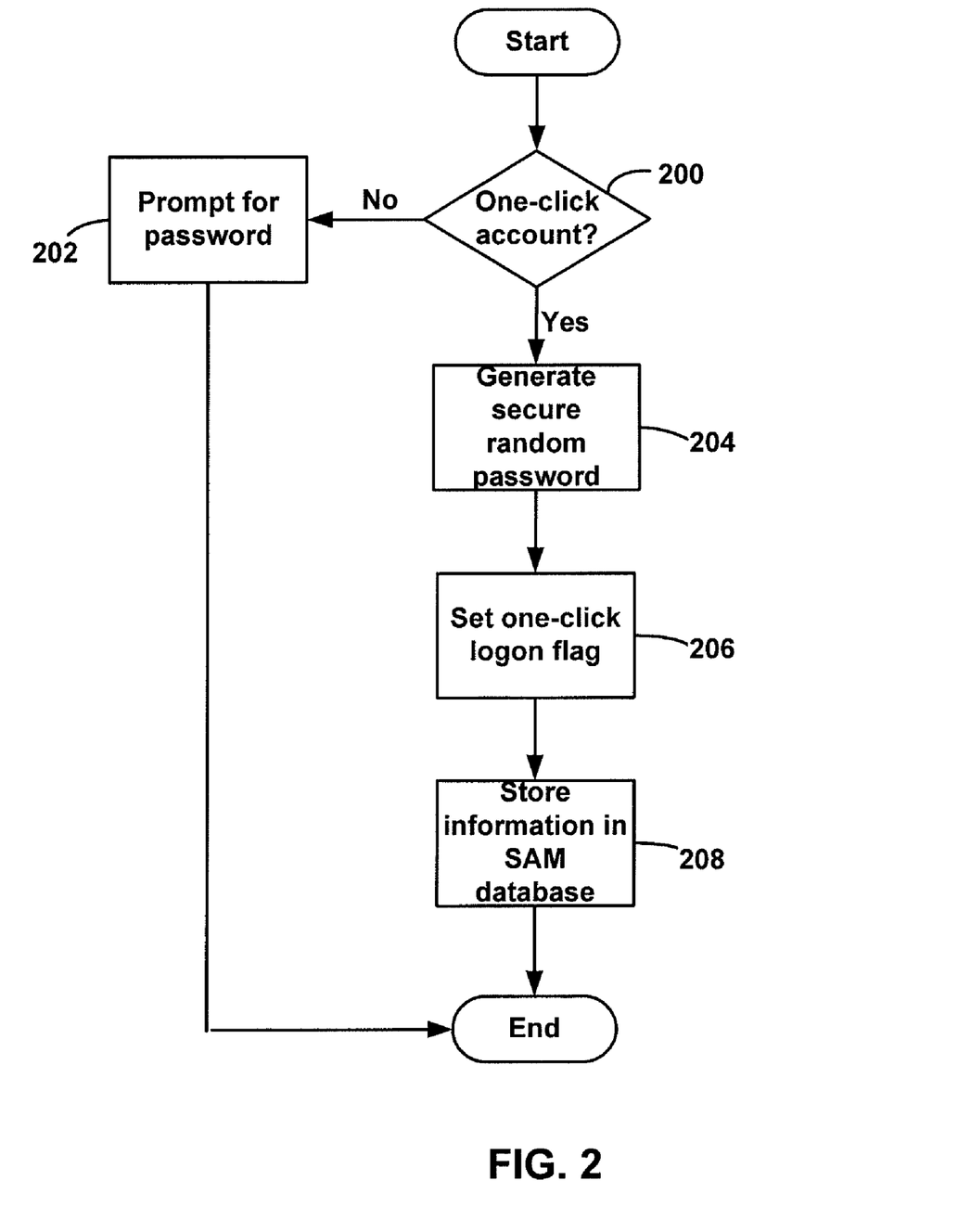
FIG. 2 is a flow diagram showing steps associated with the creation of a new one-click logon account by a user, in accordance with an embodiment of the invention.

FIG. 2 illustrates a process by which a new one-click logon account is created, in accordance with aspects of the present invention. In FIG. 2, after a start block, the process flows to decision block 200, at which it is determined whether the new account is to be a one-click logon account or a conventional user-selected password account. In an embodiment of the invention, a new user account is established as a one-click logon account unless the user chooses to specify a password for the account. If the new account is not a one-click account, at block 202 the user is prompted to enter a password. Otherwise, at block 204, a cryptographically strong random password is generated for the new account. Because a strong random password is used, the machine on which the account is created is protected from dictionary attacks or other unauthorized external access. Moving to block 206, a data flag is set indicating that the account is a one-click logon account. The flag may be one of a set of control flags for the account. At block 208, the user's security profile information, including the generated strong random password, is securely stored in a database. The process then moves to an end block. The user account information, including the user-specific strong random password, is then replicated to other trusted machines in a secured network environment. The user can thereafter log on to any trusted machine in the secured group without having to enter a password. Those having skill in the art will recognize that the order of certain of these steps is arbitrary and may be changed without departing from the essence of the invention.

Figure 3:
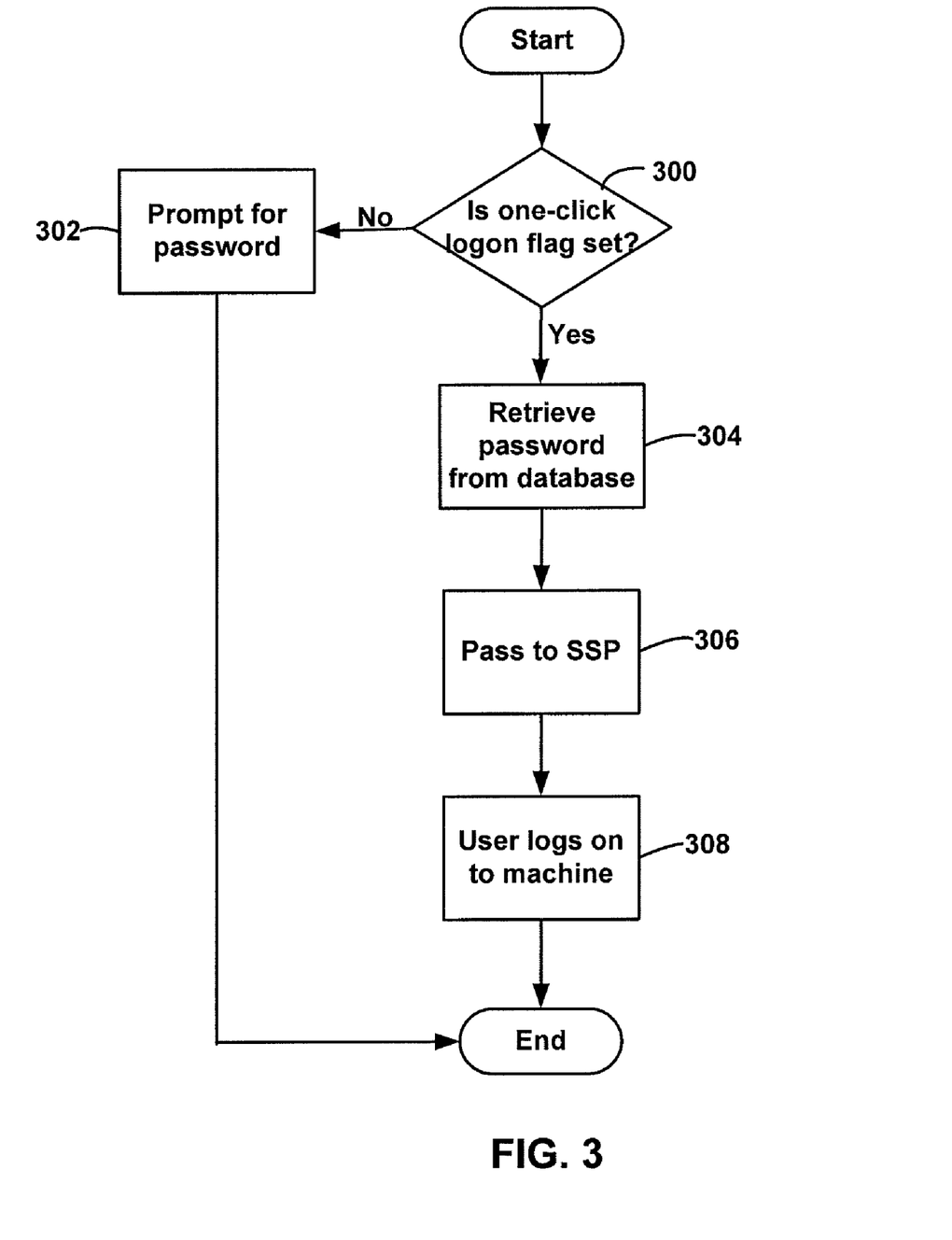
FIG. 3 is a flow diagram showing steps associated with a user login to a machine by way of a one-click logon account, in accordance with an embodiment of the invention.

FIG. 3 illustrates a process by which a user logs on to an existing one-click account on a machine. After a start block, the process flows to decision block 300, at which it is determined whether the one-click logon flag for this account is set. If the flag is not set, at block 302 the user is prompted to enter a password. If the flag is set, a password-entry dialog is not displayed by the login user interface, and the process flows to block 304, at which the database is queried for the strong random password associated with the user's one-click account. The password is passed to an SSP at block 306, and the user, now authenticated, completes the login at block 308. The process then moves to an end block.

Figure 4:
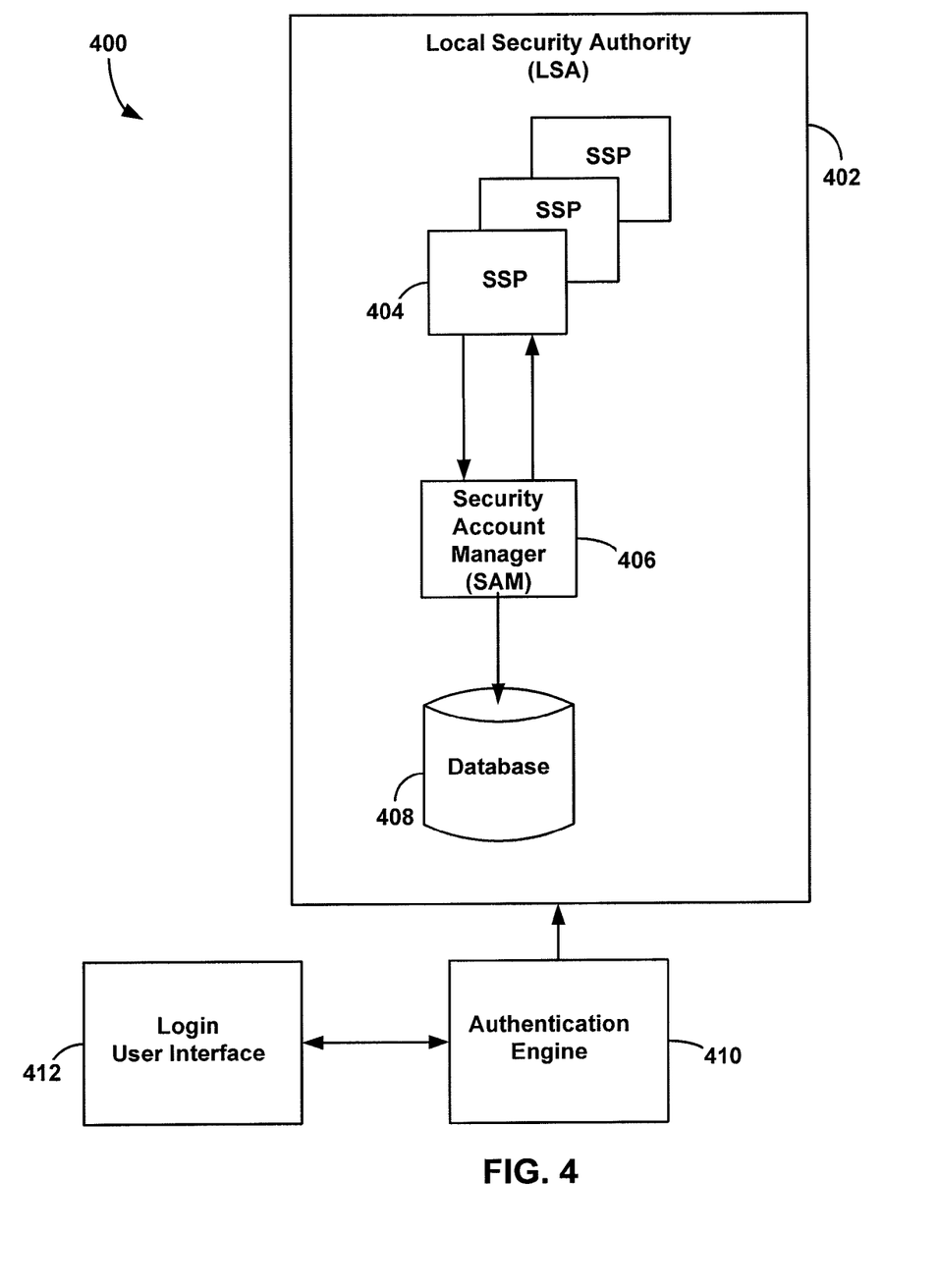
FIG. 4 is a block diagram showing components of a computer configured in accordance with an embodiment of the invention.

Components of a computing device configured in accordance with an embodiment of the present invention are illustrated further in the block diagram of FIG. 4. As illustrated, computing device 400 includes computer-readable storage medium having computer-executable instructions and comprises Local Security Authority (LSA) 402, authentication engine 410 and login user interface 412. LSA 402 comprises SSPs 404, Security Account Manager 406, and database 408. In an illustrative embodiment the LSA 402 is a user-mode process that is responsible for the local system security policy. The security policy controls such matters as user authentication, password policies, privileges that are granted to users and groups, and system security audit settings. An SSP 404 comprises, in an illustrative embodiment, a dynamically-linked library that makes security protocol packages available to applications. The SAM 406 is a service that maintains user account information by way of a security information database 408. The device 400 also includes a user authentication engine 410 that interacts with the LSA 402 and the login user interface 412.

In accordance with aspects of the invention, when a user attempts to log on to the computer 400 by way of a one-click logon account, the user authentication engine 410 causes the login user interface component 412 to display the user accounts associated with the computer 400. By way of the user interface 412, the user clicks on a user account tile or other representation of his account, and the user interface component 412 communicates to the user authentication engine 410 the user's selection. The user authentication engine 410 informs the LSA 402 that the user wishes to log on by way of the selected user account. Within the LSA 402, the SSP 404 retrieves the password from the database 408 by way of the SAM 406 so that it may be used to authenticate the user seeking to log on to the machine 400 by way of the one-click logon account.

Embodiments of the present invention may also be used with biometrically authenticated accounts. In biometric account protection, a user securely logs on to a machine by presenting a distinctive physical characteristic, such as a thumbprint, to an input device. In accordance with an embodiment of the invention, when a user establishes a biometric account, a strong random password is generated for the account and stored in a security account database, as with the one-click logon accounts described above. When the user seeks to log on to a machine, the SSP retrieves the strong random password from the database and the account is authenticated for user login.

Other embodiments of the present invention are incorporated in managed as well as unmanaged network environments. The invention makes possible the use of simplified user interfaces, such as login interfaces that do not display a password dialog. Convenient user interfaces that have hitherto been limited to blank password accounts on standalone machines are, by way of the invention, made available to secured network groups.

Preferred embodiments of the present invention are described herein, including the best mode known to the inventors for carrying out the invention. In view of the many possible embodiments to which the principles of this invention may be applied, it should be recognized that the embodiments described herein are meant to be illustrative only and should not understood to limit the scope of the invention. Those having skill in the art will recognize that the described embodiments can be modified in arrangement and detail without departing from the spirit of the invention. Therefore, the invention as described herein contemplates all such embodiments as may come within the scope of the following claims and equivalents thereof.

What is claimed is:

1. A method for providing a user with access to one or more computers, the method comprising:

establishing a blank password account by default at a first computer that does not require user entry of a password to login at any time unless a selection is received to establish a conventional account that requires user entry of a password each time to login that is used to generate a new account for the user;

receiving an entry of a human generated password when the selection is the conventional account and for subsequent logins to the conventional account entry of the human generated password is required;

when the selection is not received to establish the conventional account, creating a black password account performing actions comprising:

automatically generating a strong random password without any user input for the a black password account for the user; wherein the strong random password is the only password that is used to login when in physical proximity to the first computer; wherein the strong random password comprises at least seven characters including numbers and symbols generated entirely without user input;

designating the new account as the blank password account that is a one-click logon account such that the user is not prompted to enter any authentication information including any password including the strong random password upon any logon attempt to the established blank password account while in physical proximity to the first computer;

storing the strong random password on the first computing device;

receiving a selection of a representation of a user's account on a second computer;

determining when the second computer is at a location that is within physical proximity of the first computer and is part of a secured group with the first computer;

determining when the user's account is associated with the conventional account and when the user's account is associated with the blank password account;

when the account is the conventional account then requiring the user entry of the password;

when the account is the established blank password account then not displaying a password-entry dialog and automatically retrieving the strong random password entered at the first computer without prompting the user to enter the strong random password or any other information such that the user is logged into the blank password account after receiving the selection of the representation of the user's account on the second computer.

2. The method of claim 1, wherein storing the strong random password comprises securely storing the password.

3. The method of claim 1, further comprising initially determining whether the new account is to be a blank password account.

4. The method of claim 3, further comprising, if the new account is not to be a blank password account, prompting the user to choose a password.

5. The method of claim 3, wherein initially determining whether the new account is to be a blank password account further comprises establishing the new account as a blank password account unless the user indicates that the new account is not to be a blank password account.

6. The method of claim 1, wherein designating the new account as a blank password account further comprises setting a flag.

7. The method of claim 1, wherein storing the strong random password further comprises storing the strong random password by way of a database.

8. The method of claim 1, further comprising replicating the strong random password to each computer in a plurality of linked computers other than the first computer.

9. The method of claim 8, wherein replicating the strong random password further comprises replicating the strong random password to one or more trusted nodes in a secured network group.

10. The method of claim 9, further comprising providing the user with at least the same access privileges with respect to the secured network group as a non-blank password account user.

11. The method of claim 1, wherein generating the strong random password for the new account further comprises generating a strong random password for a biometrically authenticated account.

12. A system for controlling access to computers in a secured network group, the system comprising:
establishing a blank password account by default at a first computer that does not require user entry of a password to login at any time unless a selection is received to establish a conventional account that requires user entry of a password each time to login that is used to generate a new account for the user;
receiving an entry of a human generated password when the selection is the conventional account and for subsequent logins to the conventional account entry of the human generated password is required;
when the selection is not received to establish the conventional account, creating a black password account performing actions comprising:
automatically generating a strong random password without any user input for the a black password account for the user; wherein the strong random password is the only password that is used to login when in physical proximity to the first computer; wherein the strong random password comprises at least seven characters including numbers and symbols generated entirely without user input;
designating the new account as the blank password account that is a one-click logon account such that the user is not prompted to enter any authentication information including any password including the strong random password upon any logon attempt to the established blank password account while in physical proximity to the first computer;
storing the strong random password on the first computing device;
receiving a selection of a representation of a user's account on a second computer;
determining when the second computer is at a location that is within physical proximity of the first computer and is part of a secured group with the first computer;
determining when the user's account is associated with the conventional account and when the user's account is associated with the blank password account;
when the account is the conventional account then requiring the user entry of the password;
when the account is the established blank password account then not displaying a password-entry dialog and automatically retrieving the strong random password entered at the first computer without prompting the user to enter the strong random password or any other information such that the user is logged into the blank password account after receiving the selection of the representation of the user's account on the second computer.

13. The system of claim 12, wherein storing the strong random password comprises securely storing the password.

14. The system of claim 12, wherein designating the new account as a blank password account further comprises setting a flag.

15. The system of claim 12, further comprising replicating the strong random password to each computer in the secured network group.

16. The system of claim 12, further comprising providing the user with at least the same access privileges with respect to the secured network group as a non-blank password account user.

17. The system of claim 12, wherein generating the strong random password for the new account further comprises generating a strong random password for a biometrically authenticated account.

18. A memory storing computer-executable instructions for providing a user with access to a computer, the instructions comprising:
establishing a blank password account by default at a first computer that does not require user entry of a password to login at any time unless a selection is received to establish a conventional account that requires user entry of a password each time to login that is used to generate a new account for the user;
receiving an entry of a human generated password when the selection is the conventional account and for subsequent logins to the conventional account entry of the human generated password is required;
when the selection is not received to establish the conventional account, creating a black password account performing actions comprising:
automatically generating a strong random password without any user input for the a black password account for the user; wherein the strong random password is the only password that is used to login when in physical proximity to the first computer; wherein the strong random password comprises at least seven characters including numbers and symbols generated entirely without user input;
designating the new account as the blank password account that is a one-click logon account such that the user is not prompted to enter any authentication information including any password including the strong random password upon any logon attempt to the established blank password account while in physical proximity to the first computer;

storing the strong random password on the first computing device;

receiving a selection of a representation of a user's account on a second computer;

determining when the second computer is at a location that is within physical proximity of the first computer and is part of a secured group with the first computer;

determining when the user's account is associated with the conventional account and when the user's account is associated with the blank password account;

when the account is the conventional account then requiring the user entry of the password;

when the account is the established blank password account then not displaying a password-entry dialog and automatically retrieving the strong random password entered at the first computer without prompting the user to enter the strong random password or any other information such that the user is logged into the blank password account after receiving the selection of the representation of the user's account on the second computer.

19. The system of claim 18, further comprising replicating the strong random password to each computer in a secured network group.

20. The system of claim 18, further comprising providing the user with at least the same access privileges with respect to the secured network group as a non-blank password account user.

* * * * *